United States Patent [19]

Peck et al.

[11] 4,374,553
[45] Feb. 22, 1983

[54] CALIPER TYPE DISC BRAKE

[75] Inventors: Raymond E. Peck, Dearborn Heights; Randall P. Petresh, Northville; Gary N. Benninger, Dearborn, all of Mich.

[73] Assignee: Ford Motor Company, Dearborn, Mich.

[21] Appl. No.: 129,866

[22] Filed: Mar. 13, 1980

Related U.S. Application Data

[63] Continuation-in-part of Ser. No. 959,554, Nov. 13, 1978, abandoned.

[51] Int. Cl.³ .......................................... F16D 55/224
[52] U.S. Cl. ................................ 188/73.45; 188/72.4; 188/73.32
[58] Field of Search ................... 188/72.4, 73.3, 73.5, 188/73.6, 73.34, 73.35, 73.44, 73.45, 73.32

[56] References Cited

U.S. PATENT DOCUMENTS

| | | | |
|---|---|---|---|
| 2,756,844 | 7/1956 | Chamberlain et al. | 188/72.4 |
| 2,781,106 | 2/1957 | Lucien | 188/72.4 |
| 3,081,843 | 3/1963 | Dotto et al. | 188/73.3 |
| 3,346,075 | 10/1967 | Swift | 188/73.3 |
| 3,500,969 | 3/1970 | Asher | 188/72.4 |
| 3,580,362 | 5/1971 | Falk | 188/72.4 |
| 3,616,877 | 11/1971 | Collins | 188/73.3 |
| 3,773,149 | 11/1973 | Toohida et al. | 188/72.4 |
| 3,781,068 | 12/1973 | Brooks | 308/4 R |
| 3,800,923 | 4/1974 | Rike | 188/73.3 |
| 3,930,564 | 1/1976 | Kobayashi et al. | 188/72.4 |
| 4,034,857 | 7/1977 | Kondo et al. | 188/73.3 |
| 4,265,340 | 5/1981 | Scott et al. | 188/73.3 |
| 4,274,514 | 6/1981 | DuCharme et al. | 188/73.3 |

FOREIGN PATENT DOCUMENTS

| | | | |
|---|---|---|---|
| 2338361 | 2/1974 | Fed. Rep. of Germany | 188/72.4 |
| 2538017 | 3/1976 | Fed. Rep. of Germany | 188/73.3 |

*Primary Examiner*—Duane A. Reger
*Attorney, Agent, or Firm*—Steven L. Permut; Clifford L. Sadler

[57] ABSTRACT

A disc brake includes a torque member rigidly mounted to an axle of a vehicle wheel. The torque member has arms protruding radially outward beyond the edge of the rotor. A caliper is mounted to the outer periphery of the torque member arms by pins extending through apertures within the caliper and the arms. The pins have a radially enlarged portion which slideably mount an outboard brake shoe. An inboard brake shoe is fitted between the two torque member arms and abuts the side edges of the arms. The caliper houses a piston which when actuated moves the inboard brake shoe into engagement with the rotor such that the caliper reaction portion urges the outboard brake shoe to press against the outboard side of the rotor. Torque stress from the brake shoes is transferred to the torque arms bypassing the caliper.

5 Claims, 6 Drawing Figures

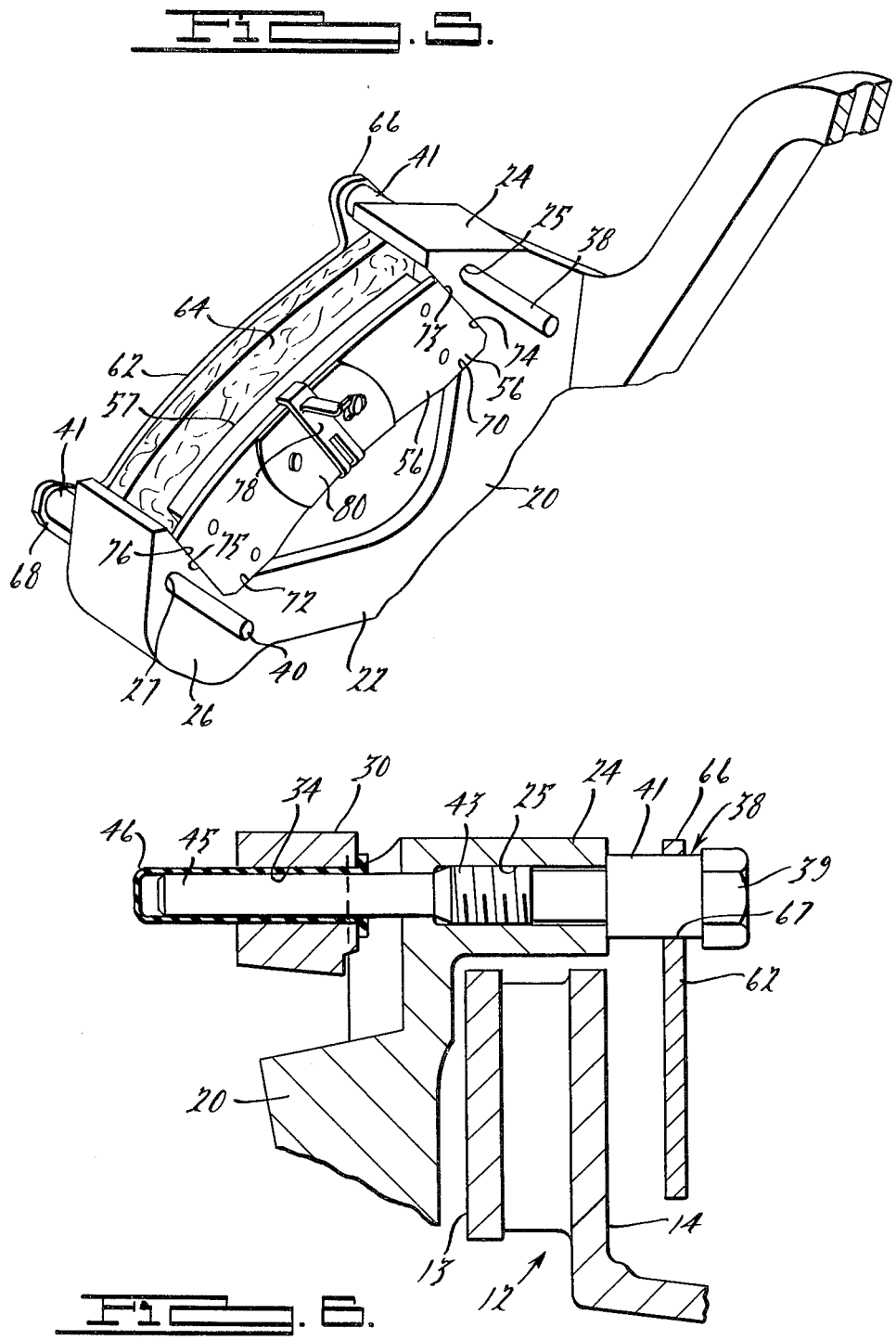

CALIPER TYPE DISC BRAKE

This is a continuation-in-part of application Ser. No. 959,554 filed Nov. 13, 1978, now abandoned.

BACKGROUND OF THE INVENTION

1. Field of the Invention. This invention relates to disc brakes and more particularly disc brakes for motor vehicle wheels and the like.

2. Description of the Prior Art. Disc brakes generally comprise a rotor mounted on a wheel rotatable about an axle. An anchor member rigidly mounted to the axle, has a caliper mounted thereon which has a piston and reaction portion, each of which engages a brake shoe. The brake shoes are movable to an abutting position against two sides of the rotor. The great torque involved in slowing down a rapidly spinning wheel must be transferred from the spinning wheel and rotor to the non-rotating anchor member.

Many disc brake assemblies have the brake shoes abut the caliper to transfer the torque through the caliper and to the anchor member. Such constructions have been disclosed in U.S. Pat. Nos. 2,756,844 issued to Chamberlain et al on July 31, 1956; 3,346,075 issued to Swift on Oct. 10, 1967; U.S. Pat. No. 3,388,774 issued to Burnett on June 18, 1968; U.S. Pat. No. 3,580,362 issued to Falk on May 25, 1971; U.S. Pat. No. 3,616,877 issued to Collins on Nov. 2, 1971 and U.S. Pat. No. 3,800,923 issued to Rike on Apr. 2, 1974. The Chamberlain et al, Swift and Burnett references all disclose calipers which are mounted to the anchor member by pins or bolts. The Falk reference disclose bolts which extend through slots in the shoes. However this design, even though it balances the forces exerted on the caliper, forces the caliper to be secured in an extremely rigid fashion to the anchor plate to be able to withstand the torque loads. The extremely rigid mounting of the caliper tends to make the brake assembly prone to shudder and rough braking which is transmitted to the vehicle body and felt by the passengers.

U.S. Pat. No. 3,500,969 issued to Asher discloses brake shoes and a two-piece caliper mounted on bolts with special U-shaped arms secured to the caliper and functioning as the reaction portion of the caliper which receives torque from the braking forces exerted on the brake shoes.

U.S. Pat. No. 3,781,068 issued to Brooks discloses another brake which transmits torque through the caliper by flanges of the brake shoe abutting walls of the caliper. Pins passing through the anchor plate are used as guides for the brake pads.

Other caliper disc brake assemblies have been disclosed which eliminate the caliper undergoing the stress of the torque transfer by having the transfer of the torque pass directly from the brake shoes to the anchor member. Such direct transfers are disclosed in U.S. Pat. No. 2,781,106 issued to Lucien on Feb. 12, 1957; U.S. Pat. No. 3,081,843 issued to Dotto et al on Mar. 19, 1963; and U.S. Pat. No. 3,773,149 issued to Toshida et al on Nov. 20, 1973.

The Dotto et al patent discloses a removable pin mounting the caliper to the anchor. The Lucien patent discloses brake shoes mounted on pins for slideable movement therealong.

The advantage of the caliper not receiving torque is that smoother brake operation is possible. In addition, the caliper can be made from weight saving materials. The disadvantage with the above design is that service of the wheel bearings is more difficult due to the anchor plate hanging down on both sides of the rotor necessitating removal of the anchor plate when servicing the bearings.

U.S. Pat. No. 4,034,857 issued to Kondo et al discloses pins threaded into a lug which is welded onto the anchor plate. The pins are used for guiding the caliper. The caliper brake shoe directs torque directly to the anchor plate. The lugs slideably mount an opposing brake shoe which has apertures receiving the lugs. The problem with the Kondo disclosure is that the lugs are a permanent part of the anchor plate and cannot be easily replaced if its sliding surface which the brake shoe slides upon is damaged.

What is desired is a replaceable one-piece pin secured to the anchor plate and constructed to have sufficient strength to be used as a torque transmitting member for one brake shoe as well as a guide member for the brake shoe and simultaneously mount the caliper free from any torque transmission therethrough. The known prior art does not disclose or suggest a way to construct this desirable caliper disc brake construction.

SUMMARY OF THE INVENTION

According to the invention, a caliper disc brake is constructed to provide for direct transfer of torque forces from brake shoes engaging a rotating rotor directly to an anchor or torque member while being easily and compactly assembled.

The disc brake includes a rotor having friction faces on the inboard and outboard sides thereof and being mounted to a wheel for rotation. The wheel commonly will be mounted through a spindle to an axle of a motor vehicle. A pair of brake shoes are mounted for engagement with the friction faces of the rotor. A stationary torque member is integral to the wheel spindle at one of the inboard and outboard sides of the rotor and radially extends beyond the periphery of the rotor. A caliper mounted to the torque member straddles the rotor. Actuating means are housed in the caliper for moving the brake shoes into and out of engagement with the friction faces of the rotor. In one embodiment, the stationary torque member is secured to the spindle at the inboard side of the rotor. In one embodiment, the caliper has a U-shaped configuration with the rotor extending within a groove between two legs of the caliper.

At least one guide element mounts the caliper to the torque member radially outward of the edge of the rotor with the caliper mounted at the inboard side of the torque member such that the torque member is interposed between the mounted portion of the caliper and the plane of the rotor. The caliper is mounted for movement in a transverse direction to the plane of the rotor. The guide element spans both sides of the rotor such that a portion of the guide element is on the inboard side and a portion is on the outboard side of the rotor.

The first and second brake shoe of said pair of brake shoes are respectively mounted on the outboard and inboard sides of the rotor. The first brake shoe is mounted to the guide element on the opposite side of the rotor from the mounted portion of the caliper with the torque member interposed therebetween such that torque applied to the brake shoe from the rotor is transferred through the guide element to the stationary torque member.

Retaining means retain the second brake shoe on the same side of the rotor as the mounted portion of the caliper. In one embodiment, the retaining means includes radially aligned and radially transverse surfaces integral with the torque member adjacent to the radially inner and side edges of the second brake shoe such that the radially aligned surfaces are in torque transfer relationship with the side edges of the second brake shoe.

In one embodiment, the guide element includes pins extending through apertures in the caliper, apertures in the torque member and apertures in the first brake shoe with the torque member interposed between the caliper and first brake shoe. The caliper and first brake shoe are mounted for movement along the guide pin and transverse to the rotor faces.

Further, the pin has its head portion positioned adjacent the first brake shoe with a structurally strengthened section extending from the first brake shoe to the anchor plate. In the one embodiment, the first brake shoe has radially extending ears which extend radially outward to be adjacent the caliper at whatever radial position the brake shoe is in to interlock the first brake shoe within the caliper assembly even when said pins are not engaged to the brake assembly.

BRIEF DESCRIPTION OF THE DRAWINGS

Reference now will be made to the accompanying drawings in which:

FIG. 5 is a fragmentary perspective showing the brake shoes mounted to the torque member.

FIG. 6 is a fragmentary and segmented view taken along lines VI—VI shown in FIG. 1.

DETAILED DESCRIPTION OF THE PREFERRED EMBODIMENT

Figure 1:
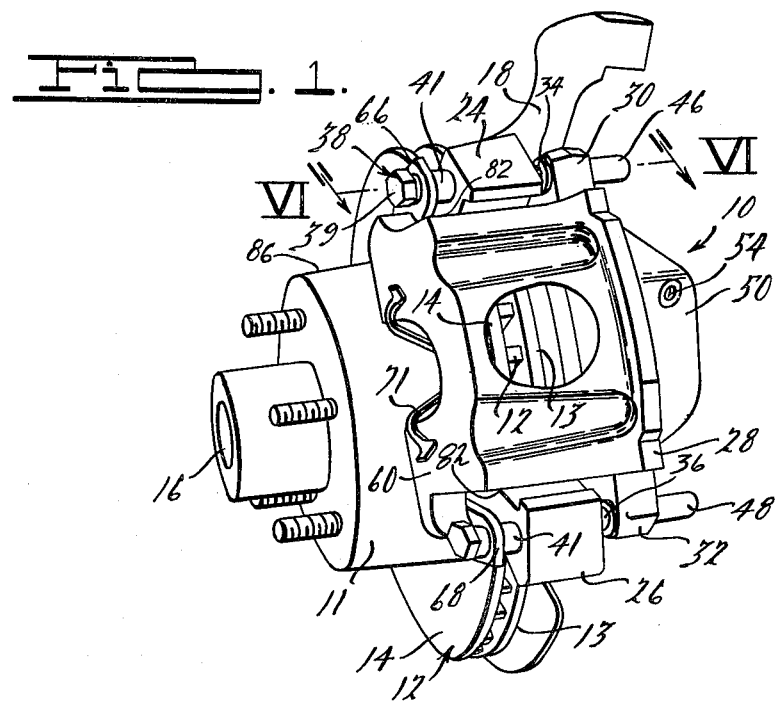
FIG. 1 is a perspective view of the preferred embodiment of the invention.

Referring to FIG. 1, a brake mechanism 10 is shown with a rotor 12 rotatably mounted about an axle 16. The rotor has an inboard friction face 13 and an outboard friction face 14. The rotor 12 is connected to hub 11 which can mount a wheel 15 as shown in FIG. 3.

Figure 2:
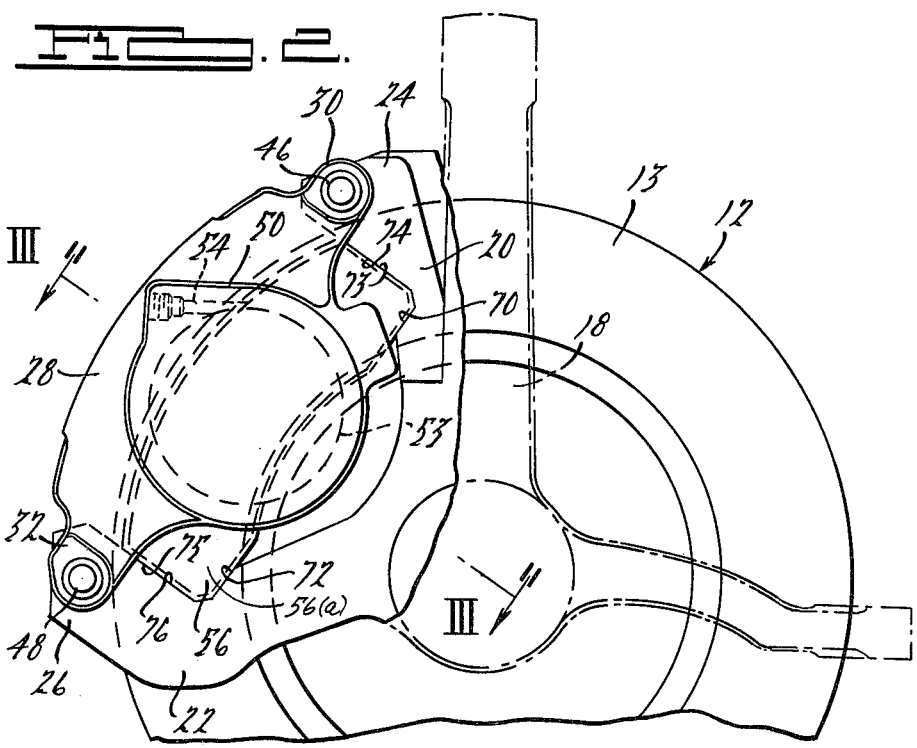
FIG. 2 is a side elevational inboard view of the embodiment shown in FIG. 1.

A torque member 18 is integrally attached to the axle 16 on the inboard side of the rotor 12. The torque member 18 as shown in FIG. 2, has two arms 20 and 22 extending radially beyond the outer periphery of the rotor 12. The arms 20 and 22 have two thickened ears 24 and 26, respectively, extending over the rotor 12.

Each ear 24 and 26 has a threaded aperture 25 and 27, respectively. A caliper 28 is slidably mounted to the torque member at the inboard side. As shown in FIGS. 1, 2 and 6, caliper 28 has ears 30 and 32 with apertures 34 and 36 extending therethrough. Pins 38 and 40 extend through apertures 34 and 36 respectively. Each pin 38 and 40 has a hexagonal head 39, a radially enlarged structurally strengthened portion 41, a threaded portion 43, and boss engaging section 45. The enlarged portion 41 has a polished radially outer surface. The threaded portions 43 threadably engage apertures 25 and 27 with enlarged sections 41 abutting ears 24 and 26. Protective rubber sleeves 46 and 48 are placed about pins 38 and 40 and extend through apertures 34 and 36 in the caliper. An optional low friction teflon sleeve (not shown) can be placed about sections 45 of pins 38 and 40 inside the sleeves 46 and 48.

Figure 3:
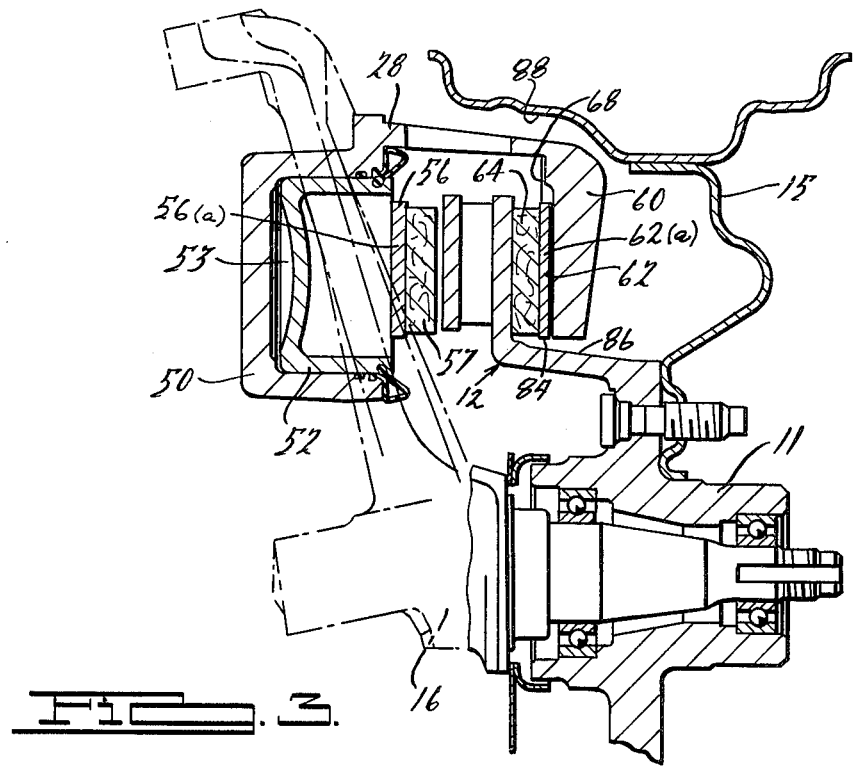
FIG. 3 is a fragmentary partially segmented view taken along the lines III—III shown in FIG. 2.

Referring to FIGS. 2 and 3, the caliper 28 has a housing section 50 which houses a piston 52. The housing has an interior chamber 53 and an aperture 54 in communication with a supply of pressurized hydraulic fluid. The caliper, as shown in FIG. 3, is generally U-shaped with an integral reaction portion 60 extending downward on the outboard side of the rotor.

As shown in FIGS. 2, 3 and 6, inboard brake shoe 56 with friction surface is fitted between the two arms 20 and 22 of the torque member 18 and between the piston and inboard face 13 of rotor 12. The brake shoe 56 comprises a metal backing plate 56(a) and a brake lining 57 riveted or bonded to the backing plate. The backing plate 56(a) of the brake shoe 56 has side edges 73 and 75. The torque member arms 20 and 22 have radially transverse surfaces 70 and 72 which engage the backing plate 56(a) of inboard brake shoe 56 and side surfaces 74 and 76 to abut side edges 73 and 75 of the brake shoe 56 and to retain the inboard brake shoe 56 in its circumferential position when the shoe is engaged with the rotor. Edges 70, 72, 74 and 76 of the torque member 18 are polished to facilitate smooth operation of inboard brake shoe 56. Inboard side of shoe 56 has a retaining clip 78 snapped onto the backing plate 56(a) for engagement with piston 52. A noise insulator lining 80 is also attached to the inboard side of the backing plate 56(a) of shoe 56.

As shown in FIGS. 1, 3 and 5, fitting between the reaction portion 60 and the rotor 12 is an outboard brake shoe 62 which comprises a backing plate 62(a) and a brake lining 64 attached thereto. The backing plate 62(a) of outboard brake shoe 62 has radially extending ears 66 and 68 with apertures 67 and 69 slideably receiving the enlarged section 41 of each pin 38 and 40. Consequently, the aperture 67 and 69 have a larger radius than apertures 25 and 27 and the torque member 18 and apertures 34 and 36 in the caliper. The outboard side of the backing plate 62(a) of the shoe 62, as shown in FIG. 4, has a clip 71 riveted thereon for engagement with the reaction portion 60 of caliper 28.

Figure 4:
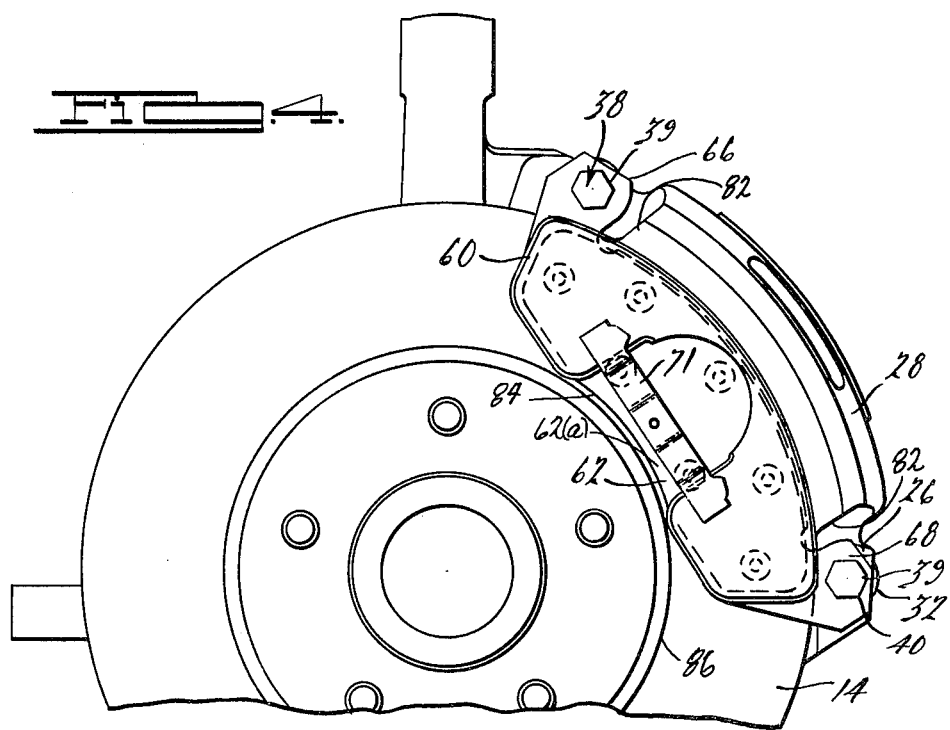
FIG. 4 is a side elevational outboard view showing the opposing side from that shown in FIG. 2.

Referring to FIGS. 3 and 4, the ears 66 and 68 radially extend outward such that the edges 82 of caliper 28 are interposed therebetween and remain therebetween when inner edge 84 of shoe 62 drops to abut surface 86 of hub 11 and caliper 28 is radially displaced outward to abut rim surface 88 of wheel 15 such that the shoe 82 remains interlocked in the brake mechanism 10 if the pins 38 and 40 are not fastened to torque member 18 when the wheel 15 is secured to hub 11. The shoe 82 remains interlocked against torque forces exerted by the rotor.

OPERATION

In operation, the disc brake is actuated by the introduction of hydraulic fluid under pressure into housing 50 which moves piston 52 outward to engage the inboard brake shoe 56 such that its friction surface 57 abuts friction face 13 of the rotor 12.

The caliper reactively slides inboard such that the reaction portion 60 presses the outboard brake shoe 62 against the outer face 14 of the rotor 12.

The torque stress exerted on the inboard brake shoe 56 by the spinning rotor 12 is transferred directly to the torque member 18 when one of the side edges 73 or 75 of the brake shoe 56 abuts one of the side surfaces 74 or 76, respectively, of the arms 20 or 22. The particular engagement depends upon the direction of rotor rotation. Brake shoe edge 75 engages surface 76 of arm 22 when the rotor 12 is rotating forwardly and edge 73 engages arm 20 when the rotor 12 is rotating in a direction corresponding to rearward vehicle movement.

Torque stress exerted on the outboard brake shoe is transferred to the pins 38 and 40 which slideably mounts the outboard brake shoe 62. The torque transfer is carried by the structurally strengthened enlarged portion 41 adjacent the head 39 of each of the pins. The torque is transferred from the pins 38 and 40 to the ears 24 and 26 of arms 20 and 22.

The caliper 28 is mounted on the pins 38 and 40 at the inboard side of the torque member with the outboard shoe 62 mounted at the outboard side thereof such that torque stress exerted by the outer shoe on the pins is not transferred to the caliper. The reaction portion of the caliper is not mounted on the pins, therefore, no torque is transferred from the pins 38 and 40 to the reaction portion 60.

When the brake is disengaged by release of fluid pressure in interior chamber 53, piston 52 withdraws therein and pulls back inboard brake shoe 56 from friction face 13. Caliper 28 slides outboard such that reaction portion 60 moves away from rotor 12. Reaction portion 60 engages clip 71 to pull outboard brake shoe 60 from friction face 14. If the pins 38 and 40 are disengaged, the caliper 28 remains loosely fitted between the wheel rim surface 88, hub surface 86, and two ears 24 and 26 of the torque member, and straddled over the rotor 12, the inboard shoe 56 remains in between the torque member surfaces 74 and 76, and the outboard shoe 62 remains interlocked between the caliper 28 and rotor 12 to maintain an operable brake mechanism.

In this fashion, a caliper housing is mounted free from any torque stresses exerted by the rotor on the brake shoes. In addition, the inboard and outboard brake shoes, and the caliper housing are efficiently mounted on the torque member arms such that all torque is transferred thereto. The assembly of the disc brake is easily accomplished by inserting the pins 38 and 40 through the appropriate apertures and placing the inboard brake shoe on the radially transverse surfaces 70 and 72 of the torque member.

The housing is also easily disassembled by the mere removal of pins 38 and 40 which will uncouple the caliper and the outboard brake shoe from the torque member and expose the inboard brake shoe for easy removal when the wheel 15 is removed from the hub 11.

The brake hub 11 can be easily serviced without removal of the torque member. In addition, if pins 38 and 40 are damaged, particularly the polished surface of the enlarged portion 41, they can be easily replaced. The advantage of having outer shoe 62 slide on the enlarged pin sections 41 is three-fold. Firstly, the enlarged section 41 is structurally strengthened where the torque transfer occurs to withstand the high loads exerted thereon. No other pin has been designed to withstand the high loads in this fashion. Secondly, less surface of the caliper and/or torque member needs to be polished to facilitate brake shoe sliding thereon. Thirdly, if the sliding surface of the enlarged portion of the pins becomes damaged, the pins can be replaced. Replacement is made by pulling the pin outboard and pushing the replacement pin inboard from the outboard side through the respective apertures. No other brake discloses this replacement feature on a structurally strengthened pin for a torque-free mounted caliper.

Variations and modifications can be made within the scope of the foregoing disclosure and drawings without departing from the spirit of the invention which is defined by the appended claims.

We claim:

1. A disc brake comprising:
a rotatable rotor having friction faces on the first and second side thereof;
a stationary torque member being disposed at one of the first and second sides of the rotor;
said torque member having an ear radially extending outward of said rotor;
a caliper straddling said rotor;
a first and second brake shoe adjacent the first and second sides of said rotor;
a one-piece guide element slidably mounting a mounted portion of said caliper to said ear of said torque member with said torque member being interposed between said mounted portion of said caliper and said rotor such that said caliper is movable in a transverse direction to said rotor faces along said guide element;
said guide element spanning said rotor and passing through an internally threaded aperture in said ear of said torque member and threadably engaged therewith;
said guide element comprising a pin with spaced apart first and second non-threaded portions with a threaded section therebetween engaging said ears of said torque member;
the first non-threaded portion extending through an aperture in said mounted portion of the caliper and the second non-threaded portion extending through an aperture in the first brake shoe, with said portion of the caliper and the first brake shoe being disposed on opposing sides of said ear of said torque member;
the second non-threaded portion being structurally stronger than said first non-threaded portion and having a larger radius than said first non-threaded portion and threaded portion of said pin and said apertures in said torque member and said caliper;
said aperture in said first brake shoe being larger than the apertures in said torque member or caliper to slidably receive said second non-threaded section;
said first brake shoe being mounted to said second non-threaded portion of said guide element on an opposite side of said rotor from said mounted portion of said caliper such that torque applied to said brake shoe from said rotor is transferred through said second non-threaded portion of said guide element to said stationary torque member;
actuating means for moving said brake shoes into engagement with said friction faces of said rotor;
retaining means for retaining said second brake shoe on the same side of said rotor as said mounted portion of said caliper in an operable position between said actuating means and said rotor and in torque transfer relationship directly with said torque member;
the caliper and first brake shoe being slidably mounted on the first and second non-threaded portions respectively of said pin for movement transverse to said rotor.

2. A disc brake and wheel assembly comprising:
a rotor having friction faces on the first and second sides thereof;
said rotor being connected to a rotatable hub;
a wheel being connected to said hub with an axially extending annular rim;

a stationary torque member disposed at one of the first and second sides of the rotor;

said torque member having a pair of ears radially extending outward of said rotor;

said caliper straddling said rotor and located radially inward of said rim of said wheel;

first and second brake shoes adjacent the first and second sides respectively of said rotor;

a one-piece guide element for slidably mounting a mounted portion of said caliper to one of said ears of said torque member with said torque member interposed between said mounted portion of said caliper and said rotor such that said caliper is movable in a transverse direction to said rotor faces along said guide element;

said guide element spanning said rotor and passing through an internally threaded aperture in said one ear of said torque member and threadably engaged therewith;

said guide element comprising a pin with spaced apart first and second non-threaded portions with a threaded section therebetween engaging said one ear of said torque member;

the first non-threaded portion extending through an aperture in the caliper and the second non-threaded portion extending through an aperture in the first brake shoe, said non-threaded portions being on opposing sides of said one ear of said torque member;

said second non-threaded portion having a larger radius than said first non-threaded portion and said threaded portion of said pin and said apertures in said torque member and said caliper;

said aperture in said first brake shoe being larger than the apertures in said torque member or caliper to slidably receive said second non-threaded portion;

said first brake shoe being mounted on said guide element on an opposite side of said rotor from said mounted portion of said caliper such that torque applied to said brake shoe from said rotor is transferred through said guide element to said stationary torque member;

actuating means for moving said brake shoes into and out of engagement with said friction faces of said rotor;

retaining means for retaining said second brake shoe on the same side of said rotor as said mounted portion of said caliper in an operable position between said actuating means and said rotor and in torque transfer relationship directly with said torque member;

the caliper and first brake shoe being slidably mounted on the first and second non-threaded portions respectively of said pin for movement transverse to said rotor;

said first brake shoe having radially extending ears with said caliper being interposed between said ears of said first brake shoe;

said first brake shoe trapped between said hub, said caliper, and said rotor when said caliper is positioned between said ears of said torque member, straddling said rotor, and radially inside said rim of said wheel.

3. A disc brake and wheel assembly comprising:

a rotor having friction faces on the first and second sides thereof;

said rotor being connected to a rotatable hub;

a wheel being connected to said hub with an axially extending annular rim;

a stationary torque member disposed at one of the first and second sides of the rotor;

said torque member having a pair of ears radially extending outward of said rotor;

said caliper straddling said rotor and located radially inward of said rim of said wheel;

first and second brake shoes adjacent the first and second sides respectively of said rotor;

a one-piece guide element for slidably mounting a mounted portion of said caliper to one of said ears of said torque member with said torque member interposed between said mounted portion of said caliper and said rotor such that said caliper is movable in a transverse direction to said rotor faces along said guide element;

said guide element spanning said rotor and passing through an internally threaded aperture in said one ear of said torque member and threadably engaged therewith;

said guide element comprising a pin with spaced apart first and second non-threaded portions with a threaded section therebetween engaging said one ear of said torque member;

the first non-threaded portion extending through an aperture in the caliper and the second non-threaded portion extending through an aperture in the first brake shoe, said non-threaded portions being on opposing sides of said one ear of said torque member;

the second non-threaded portion being structurally stronger than said first non-threaded portion and having a larger radius than said threaded portion and first non-threaded portion of said pin and said apertures in said torque member and said caliper;

said aperture in said first brake shoe being larger than the apertures in said torque member or caliper to slidably receive said second non-threaded section;

said first brake shoe being mounted to said second non-threaded portion of said guide element on an opposite side of said rotor from said mounted portion of said caliper such that torque applied to said brake shoe from said rotor is transferred through said second non-threaded portion of said guide element to said stationary torque member;

actuating means for moving said brake shoes into engagement with said friction faces of said rotor;

retaining means for retaining said second brake shoe on the same side of said rotor as said mounted portion of said caliper in an operable position between said actuating means and said rotor and in torque transfer relationship directly with said torque member;

the caliper and first brake shoe being slidably mounted on the first and second non-threaded portions respectively of said pin for movement transverse to said rotor;

the ears of said torque member interposed between said mounted portion of said caliper and said first brake shoe being threadably engaged to said guide element by said threaded section thereof engaging said internally threaded aperture; and said first brake shoe having radially extending ears with said caliper being interposed between said ears of said first brake shoe;

said first brake shoe trapped between said hub, said caliper, and said rotor when said caliper is positioned between said ears of said torque member, straddling said rotor, and radially inside said rim of said wheel.

4. A disc brake comprising:

a rotatable rotor having friction faces on the first and second sides thereof;

a stationary torque member being disposed at one of the first and second sides of the rotor;

said torque member having an ear radially extending outward of said rotor;

a caliper straddling said rotor;

first and second brake shoe adjacent the first and second sides of said rotor;

a one-piece guide element slidably mounting a mounted portion of said caliper to said ear of said torque member with said torque member being interposed between said mounted portion of said caliper and said rotor such that said caliper is movable in a transverse direction to said rotor faces along said guide element;

said guide element spanning said rotor and passing through and securably attached to an aperture in said ear of said torque member;

said guide element having a radially enlarged section and a radially smaller section on opposite sides of said ear of said torque member;

the radially smaller section engaging the mounted portion of said caliper and the radially enlarged section engaging and slidably mounting the first brake shoe with said portion of the caliper and the first brake shoe being disposed on opposing sides of the ear of said torque member;

said radially enlarged portion of said pin having a larger radius than said aperture in said torque member;

said first brake shoe being mounted to said radially enlarged portion of said pin on an opposite side of said rotor from said mounted portion of said caliper such that torque applied to said first brake shoe from said rotor is transferred through said radially enlarged portion of said guide element to said stationary torque member.

5. A disc brake as defined in claim 4 wherein:

said first brake shoe has an enlarged aperture for slidably receiving said radially enlarged section of said guide element.

* * * * *